March 6, 1934.    W. L. BELKNAP    1,949,776
HEAT RESPONSIVE VALVE
Filed April 6, 1933
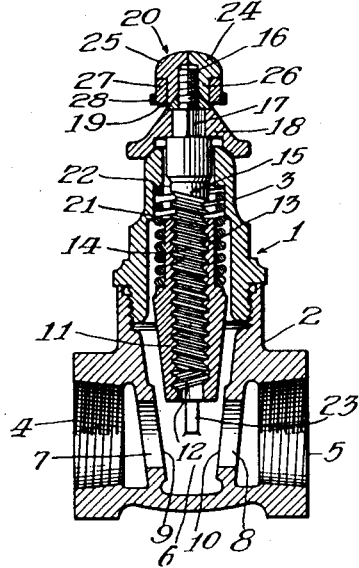
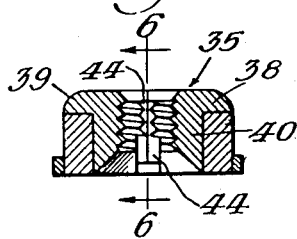
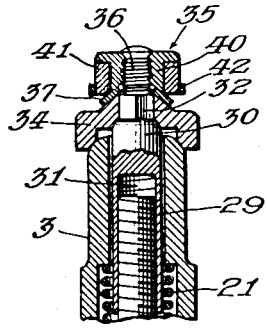
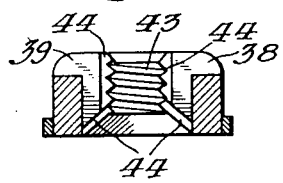
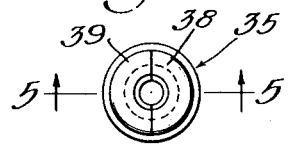
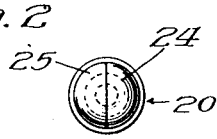
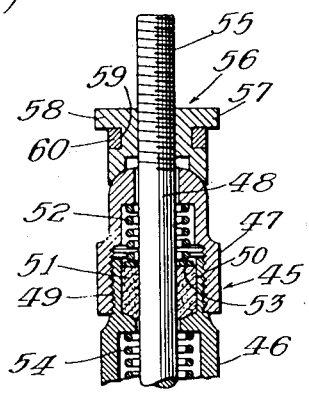
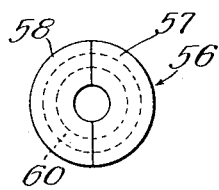
Inventor:
William L. Belknap,
By Frank L. Belknap
Attorney Patented Mar. 6, 1934

1,949,776

UNITED STATES PATENT OFFICE 1,949,776

HEAT RESPONSIVE VALVE

William L. Belknap, Bridgeport, Conn., assignor to The Belknap Manufacturing Company, Bridgeport, Conn., a corporation of Connecticut Application April 6, 1933. Serial No. 664,683

8 Claims. (Cl. 137—162)

This invention relates to improvements in heat responsive shut off valves and refers especially to a valve provided with a fusible unit, which valve may be manually opened and/or closed, and which when in open position, may be automatically closed by fusing of the unit when said valve is subjected to heat of a predetermined temperature.

As a feature of my invention, the valve closing member may be held in open position, against the tension of a spring, by a nut split into a plurality of segments, which engages a spindle attached to the closing member, said segments being removably held in position as a complete nut by a band of fusible metal. When said fusible band is subjected to a predetermined degree of heat, the same melts permitting disengagement of the nut segments with the spindle of the closing member and the movement of said member to seated position under the influence of the spring.

Other objects and advantages of my invention will be apparent from the accompanying drawing and following detail description.

In the drawing, Fig. 1 is a vertical, sectional elevation of a valve provided with the control means comprising my invention.

Fig. 2 is a top plan view of the split nut utilized in conjunction with the valve shown in Fig. 1.

Fig. 3 is a fragmentary, vertical, sectional view of a valve provided with a slightly modified form of my invention.

Fig. 4 is a top plan view of the split nut shown in Fig. 3.

Fig. 5 is a sectional view taken on the line 5—5 of Fig. 4.

Fig. 6 is a sectional view taken on the line 6—6 of Fig. 5.

Fig. 7 is a fragmentary, vertical, sectional view showing another modification of my invention.

Fig. 8 is a top plan view of the split nut utilized upon the valve shown in Fig. 7.

Referring in detail to the drawing, 1 indicates a valve having body 2 and bonnet 3, the latter being threadedly positioned upon the body. The body 2 may be provided with inlet 4 and outlet 5, said inlet and outlet being threaded for the reception of inlet and outlet pipes respectively, not shown. The body 2 may be provided with a central compartment 6 which may be connected to the inlet and outlet respectively through apertures 7 and 8 formed in the tapered partitions 9 and 10. The tapered surfaces of partitions 9 and 10 may form a seat for gate 11 which may also be of tapered construction, the angle of taper registering with the angles of the surfaces 9 and 10.

The central portion of gate 11 may be provided with internal screw threads 12, gate 11 terminating in an upwardly extending portion 13 which may also be provided with screw threads. Threads 12 formed in gate 11 and extension 13 are adapted to engage external screw threads 14 formed on the surface of spindle 15. Spindle 15 may extend through the upper portion of the bonnet 3 and may be threaded at its upper end as shown at 16 in Fig. 1. Intermediate threads 16 and threads 14, spindle 15 may be formed in square or other angular transverse section as shown at 17 in Fig. 1.

A wheel or actuating member 18 having an aperture provided in its central portion registering with the contour of the angular sectioned portion 17 of spindle 15, may be loosely positioned upon said spindle. A conical washer 19 may be adapted to be positioned immediately above the actuating member 18, said washer being positioned between member 18 and nut 20, which latter may threadedly engage the upper portion of spindle 15. A coil spring 21 may be positioned within the hollow portion of bonnet 3 and may encircle spindle 15, said spring being confined between the upper portion of gate 11 and shoulder 22 formed within bonnet 3.

As can readily be seen, gate 11 may be raised or lowered within body 2 by rotating actuating member 18, which rotation is imparted to spindle 15. Each of the side walls of compartment 6 may be provided with a rib 23 which may engage in slots, not shown, provided in the lateral sides of gate 11. By this means said gate, when raised or lowered, is maintained in alignment with the axis of compartment 6 and the axis of bonnet 3. The arrangement is such that spring 21, when gate 11 is in closed position within body 2, is under substantially reduced tension. However, when gate 11 is raised by actuating member 18, said gate acts against the compressive force of spring 21. In raised or open position, gate 11 and spindle 15 are prevented from descending into body 2 and bonnet 3 respectively by the engagement of nut 20 with the upper portion of spindle 15 and with the actuating member 18. Consequently, it can readily be seen that if said nut were disengaged from the end of the spindle 15, gate 11 acting under the impelling force of spring 21 would descend, thereby closing the valve. Threads 14 may be left handed so that the valve may be manually opened in the conventional manner, that is, by rotating actuating member 18 to the left. To prevent accidental displacement or "backing off" of nut 20, the pitch of the threads 16 may be slightly different from those of nut 20.

As a particular feature of the present invention, nut 20 comprises segments 24 and 25, and the said nut may be undercut to form a restricted lower portion 26. It is to be understood, however, that nut 20 may, if desired, comprise two or more segments. An endless band 27 is adapted to encircle the segments of nut 20 adjacent the restricted portion 26 thereof, said band being made of a readily fusible metal such as lead, a lead alloy or the like. An endless band 28 may encircle the ring 27, said band being constructed of the same material which comprises nut 20. The valve 1, as a whole, may be made of brass, bronze or some such similar material, spring 21 being made of steel, phosphor bronze or any other acceptable material.

In operation, when gate 11 is raised, spring 21 will be compressed placing spindle 15 under tension. This tension is resisted by nut 20, washer 19 and actuating member 18, which latter bears upon the upper portion of bonnet 3. It is frequently desirable, in pipe lines carrying hazardous fluids such as illuminating gas, fuel oil or the like, to interrupt the flow of said fluid in the event of fire or excessive heat. To automatically accomplish this end, ring 27 may be constructed of a readily fusible metal which, when exposed to a predetermined degree of heat, will fuse or melt. It can readily be seen that when said ring melts, the binding force exerted by the ring upon the segments 24 and 25 of nut 20 is released. The lower portion of nut 20 may be so reamed as to permit the tapered end of frustro conical washer 19 to project a relatively slight distance within the nut. Consequently, inasmuch as washer 19 and nut 20 are urged towards each other by spring 21 when valve 1 is open, washer 19 will impel the segments 24 and 25 of nut 20 outwardly in a radial direction when ring 27 collapses thereby permitting spindle 15 to descend under the influence of spring 21, closing the valve. In other words, upon the fusing of ring 27, that component of the force exerted by spring 21 which acts at right angles to spindle 15, due to the inclined surfaces of the threads upon the spindle 15 and nut 20, causes the unsupported segments of nut 20 to separate thereby rendering the nut as such inoperative.

It can readily be seen that, valve 1 may be manually opened or closed as desired without interfering with the automatic features hereinbefore described, since the manual opening or closing of the valve is dependent upon the engagement of threads 14 and 12, whereas the automatic closing of the valve is dependent upon the disengagement of the threads at the upper end of the spindle 15 and those carried within nut 20.

Referring particularly to Figs. 3 and 4, a slightly modified form of my invention is shown. The valve to which this form of my invention may be applied may be similar in essential details to valve 1. However, the gate portion of said valve instead of being internally threaded, as is the case in gate 11, may be of solid construction, the gate being integral with an upwardly projecting threaded spindle 29. A stem 30 may be loosely positioned within bonnet 3 and may be provided with internal threads 31 which are adapted to engage the threads on spindle 29. Stem 30 may normally project from bonnet 3 and may be formed intermediate its length in square or angular cross section, as shown best at 32 in Fig. 3. A wheel or actuating member 34 may be positioned upon stem 30 and may be provided with a central aperture similar in contour to the section 32.

A nut 35 may engage the upper portion of stem 30, said upper portion being provided with threads 36, and a conical washer 37 may be positioned between nut 35 and actuating member 34. Similar to valve 1, a spring 21 may be carried within bonnet 3 and may bear upon the upper portion of the gate, not shown, forming the lower end of spindle 29, said spring, when the gate is in raised position, tending to impel said gate and spindle downwardly into closed position. The downward motion of the gate and spindle, of course, is prevented by the engagement of nut 35 with the end of stem 30 and the actuating member 34.

Nut 35 may be of split construction and may comprise two or more segments 38 and 39, said nut being undercut to provide a restricted portion 40 around which ring 41 may be positioned, said ring being constructed of a readily fusible metal. A band 42 may encircle ring 41 and may serve as a reinforcement therefor. Similar to valve 1, when ring 41 is exposed to heat of a predetermined temperature it will melt or fuse thereby permitting washer 37, which extends into the reamed portion of nut 35 to separate the halves of the nut, disengaging the nut from threads 36 and permitting stem 30 and spindle 29 to descend.

If desired, spindle 29 may be raised or lowered manually without interfering with the automatic features of the valve hereinbefore described. It can readily be seen that when actuating member 34 is rotated, stem 30 engaging spindle 29 tends to raise or lower said spindle without lowering or raising stem 30.

Referring particularly to Figs. 5 and 6, enlarged views of nut 35 are shown, each half of said nut being provided with internal threads 43 which engage threads 36. To prevent binding of the threads 43 and 36 when ring 41 has melted, slots or grooves 44 may be provided adjacent the lines of juncture of the two portions of the nut 35.

The provision of slots or grooves 44, although being described in conjunction with nut 35, is also present in nuts 20 and 56 and performs the same function as described in conjunction with nut 35.

Referring particularly to Figs. 7 and 8, another modified form of my invention is shown wherein bonnet 45 is constructed in two portions, a lower portion 46 and an upper portion 47, the lower portion being mounted upon a valve body, not shown, similar to body 2. Spindle 48 may be loosely positioned within bonnet 45 and may carry at its lower end as an integral portion of said spindle a gate, not shown, similar to the gate described in conjunction with the form of my invention shown in Fig. 3.

The upper portion 47 of bonnet 45 may be threadedly mounted upon the lower portion 46 thereof, as shown best at 49 in Fig. 7, said upper portion having bore 50 in which a packing material 51 may be positioned. A spring 52 may abut at its ends against the upper portion of the member 47 and washer 53 positioned immediately above the packing material 51, spring 52 being adapted to maintain said packing material under pressure. A spring 54 may encircle spindle 48 and may be confined between the upper portion of member 46 and the upper portion of the gate, not shown, carried at the lower end of spindle 48.

It can readily be seen that when spindle 48 is in raised position, that is, when the valve is open, spring 54 is compressed and tends to urge spindle 48 downwardly. The upper end of spindle 48 may be threaded as shown at 55 in Fig. 7, said threads being adapted to engage cooperating threads carried within nut 56. Nut 56 may be constructed in symmetrical halves 57 and 58 and the intermediate portion of said nut being provided with annular groove 59. A ring 60 of readily fusible material may be positioned within the annular groove 59 and may normally hold the halves 57 and 58 of nut 56 together in engagement with threads 55.

In operation, when ring 60 is exposed to heat of a predetermined temperature, said ring will fuse or belt thereby permitting the disengagement of nut 56 from threads 55 and permit spindle 48, previously held in upward position, to descend thereby closing the valve. To manually operate the valve, nut 56 may be rotated to either lower or raise spindle 48, said manual operation in no way interfering with the automatic features hereinbefore described.

It is to be understood, of course, that my invention, although being shown and described in conjunction with a gate valve, may be utilized with other types of valves such as globe valves or the like. Although, for purposes of description, nuts split into two segments are shown, it is to be understood that said nuts may comprise two or more segments.

I claim as my invention:

1. A heat responsive shut-off valve comprising a valve body having an inlet and outlet, a bonnet mounted upon said body, a valve seat within said body, a valve closing member within said body normally held away from its seat, means normally urging said closing member towards said seat, means for restraining movement of said closing member in response to said urging means, comprising a stem normally projecting from said bonnet, said stem being connected to said closing means, a nut split into a plurality of segments threadedly mounted upon the projecting portion of said stem and preventing movement of said stem into said bonnet, and a band of readily fusible metal encircling said nut to maintain the segments comprising said nut in engagement with said stem.

2. A heat responsive shut-off valve comprising a body having an inlet and outlet, a bonnet mounted upon said valve body, a valve seat within said body, a valve closing member within said body normally held away from its seat, means for preventing rotation of said closing member, means normally urging said closing member toward said seat, means for restraining movement of said closing member in response to said urging means, comprising a stem normally projecting from said bonnet, said stem being threadedly connected to said closing member, a nut split into segments threadedly mounted upon said projecting stem, an actuating member slidably but non-rotatably mounted upon said stem intermediate the nut and the bonnet, said actuating member being in contact with the bonnet, and a readily fusible band encircling said nut to maintain the segments thereof in engagement with the stem.

3. A heat responsive shut-off valve comprising a valve casing having a bonnet, a valve seat within the casing, a valve closing member movable within the casing and normally held away from its seat, means for preventing rotation of said closing member, a spring within the casing acting to urge the valve closing member to closed position, means for restraining movement of said closing member in response to said spring, comprising a stem normally projecting from said bonnet, said stem being threadedly connected to said closing member, a nut split into a plurality of segments threadedly mounted upon said projecting stem, an actuating member slidably but non-rotatably mounted upon said stem intermediate the nut and the bonnet, said actuating member being in contact with the bonnet to rotate said stem independent of said split nut whereby to raise or lower said closing member, and a readily fusible band encircling said nut to maintain the segments thereof in engagement with the stem.

4. A heat responsive valve comprising a body having an inlet and an outlet, a bonnet mounted upon said body, a valve seat within said body, a valve closing member within said body normally held away from its seat, said member being internally threaded means for preventing rotation of said closing member, a stem positioned in said bonnet having external threads engageable with the threads in said valve closing member and having a portion normally projecting from said bonnet, a spring within said bonnet normally urging said valve closing member towards said valve seat, an actuating member slidably but non-rotatably positioned upon the projecting portion of said stem to rotate the stem and move said valve closing member, a split nut threadedly engaging the projecting portion of said stem and seated on the outer end of said actuating member, and a fusible band encircling said nut to normally maintain said split nut in engagement with said stem.

5. A heat responsive valve comprising a body having an inlet and outlet, a bonnet mounted upon said body, a valve seat within said body, a valve closing member within said body normally held away from its seat, an externally threaded extension rigidly connected to said valve closing member means for preventing rotation of said threaded extension, an internally threaded stem engageable with said threaded extension having a portion normally projecting from said bonnet, a spring within said bonnet normally urging said valve closing member towards said valve seat, an actuating member slidably but non-rotatably positioned upon the projecting portion of said stem to rotate said stem and move said valve closing member, a split nut threadedly engaging the projecting portion of said stem and seated on the outer end of said actuating member, and a fusible band encircling said nut to normally maintain said split nut in engagement with said stem.

6. In a valve having a casing, an inlet and outlet in said casing, a valve seat in the casing and a valve closing member normally held away from said seat and movable toward or away from said seat, means for automatically seating said closing member in response to heat comprising a stem having one end rigidly connected to said closing member, the opposite end of which stem is threaded and projects from the casing, a spring within the casing normally urging said closing member to seated position, a nut split into a plurality of segments normally engageable with the projecting portion of said stem, said nut bearing upon the casing under the influence of said spring, and a fusible ring circumscribing said nut and normally maintaining said nut in engagement with the projecting portion of said threaded stem.

7. A heat responsive shut-off valve comprising a valve body having an inlet and outlet, a bonnet mounted upon said body, a valve seat within said body, a valve closing member within said body normally held away from said seat, means normally urging said closing member toward said seat, means for restraining movement of said closing member in response to said urging means, comprising a stem normally projecting from said bonnet, said stem being connected to said closing means, a nut split into a plurality of segments threadedly mounted upon the projecting portion of said stem and preventing movement of said stem into said bonnet, a band of readily fusible metal encircling said nut to maintain the segments comprising said nut in engagement with said stem, and a reinforcing endless ring encircling said band.

8. A heat responsive shut-off valve comprising a body having an inlet and outlet, a bonnet mounted upon said valve body, a valve seat within said body, a valve closing member within said body normally held away from its seat, means for preventing rotation of said closing member, means normally urging said closing member toward said seat, means for restraining movement of said closing member in response to said urging means, comprising a stem normally projecting from said bonnet, said stem being threadedly connected to said closing member, a nut split into segments threadedly mounted upon said projecting stem, an actuating member slidably but non-rotatably mounted upon said stem intermediate the nut and the bonnet, a conical washer positioned between said nut and said actuating member, said nut being provided with a countersink to receive said conical washer, said actuating member being in contact with the bonnet, and a readily fusible band encircling said nut to maintain the segments thereof in engagement with the stem.

WILLIAM L. BELKNAP.